(12) United States Patent
Sturt et al.

(10) Patent No.: US 6,450,560 B1
(45) Date of Patent: Sep. 17, 2002

(54) VARIABLE SUN SCREEN FOR A VEHICLE

(75) Inventors: Alan Sturt, West Bloomfield; George Byma, Clarkston, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/951,937

(22) Filed: Sep. 12, 2001

Related U.S. Application Data

(60) Provisional application No. 60/232,023, filed on Sep. 12, 2000.

(51) Int. Cl.[7] .............................. B60J 3/02; B60J 7/043
(52) U.S. Cl. ..................... 296/97.2; 296/97.4; 296/211; 296/215
(58) Field of Search .............................. 296/97.8, 97.4, 296/97.11, 97.5, 97.2, 211, 215

(56) References Cited

U.S. PATENT DOCUMENTS

| | | | |
|---|---|---|---|
| 1,589,475 A | 9/1923 | Lowther | |
| 1,597,084 A | 11/1924 | Lowther | |
| 2,721,759 A | 4/1953 | Tashjian | |
| 2,744,783 A | 5/1956 | Peavey | |
| 3,128,121 A | 10/1961 | Greig | |
| 3,183,033 A | 8/1962 | Stulbach | |
| 3,199,114 A | 2/1963 | Malifaud | |
| 3,603,672 A | 9/1971 | Bastide | |
| 4,040,657 A | * 8/1977 | Penzes | |
| 4,362,330 A | * 12/1982 | Cramer | |
| 4,726,620 A | 2/1988 | Takahashi | |
| 4,988,139 A | 1/1991 | Yamada | |
| 5,714,751 A | 2/1998 | Chem | |
| 5,938,268 A | * 8/1999 | Wang et al. | 296/97.2 |
| 6,131,987 A | * 10/2000 | Rossiter | 296/97.8 |

FOREIGN PATENT DOCUMENTS

JP  62-50222  * 4/1987

* cited by examiner

Primary Examiner—Joseph D. Pape
(74) Attorney, Agent, or Firm—Brooks & Kushman P.C.

(57) ABSTRACT

A variable shade sun screen having first and second relatively movable sheets with alignable or offsetable matrices of translucent and opaque portions to selectively vary the opacity of the sun screen. The invention can be used in a sun visor, a sunroof, or adjacent any vehicle surface.

14 Claims, 6 Drawing Sheets

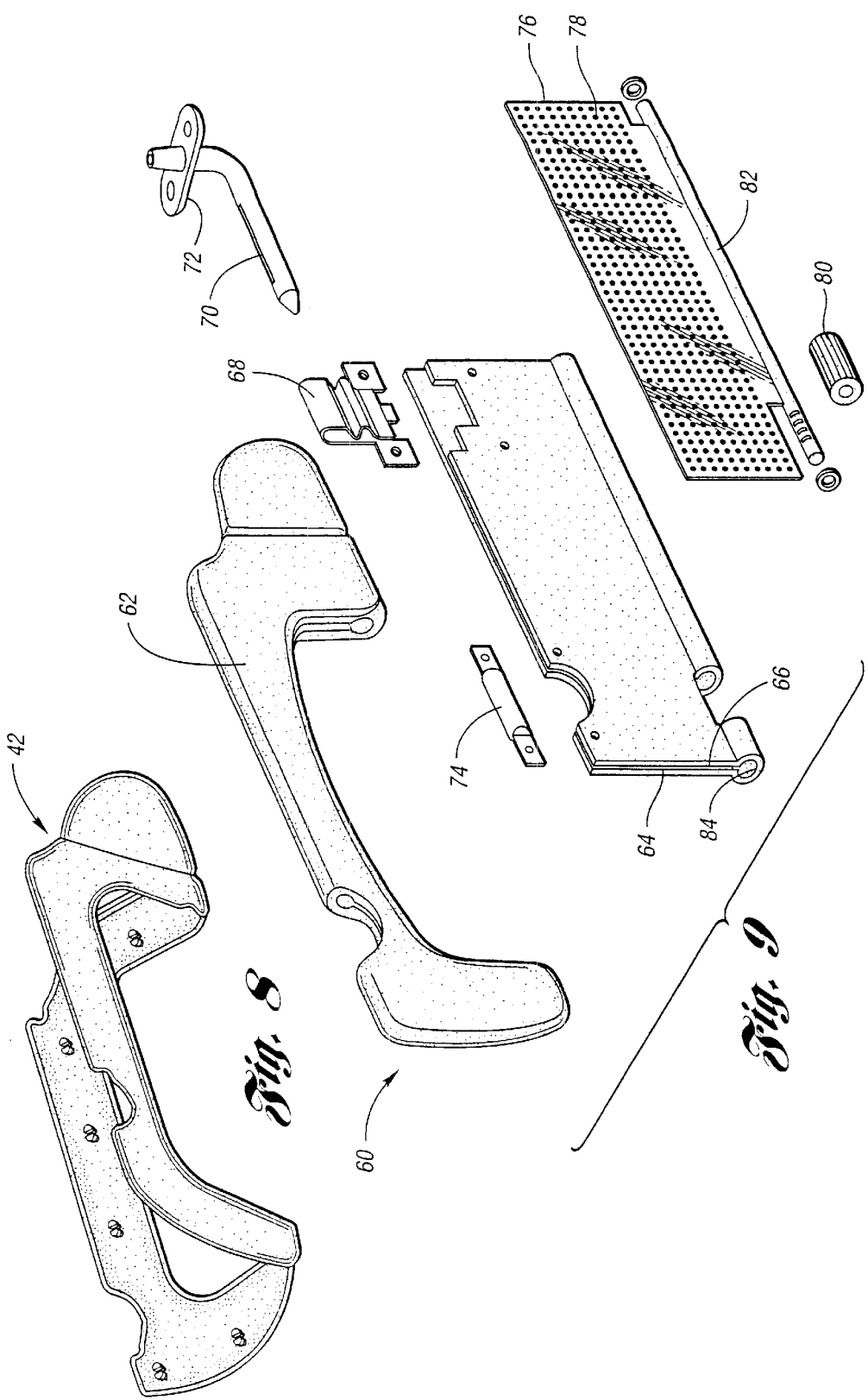

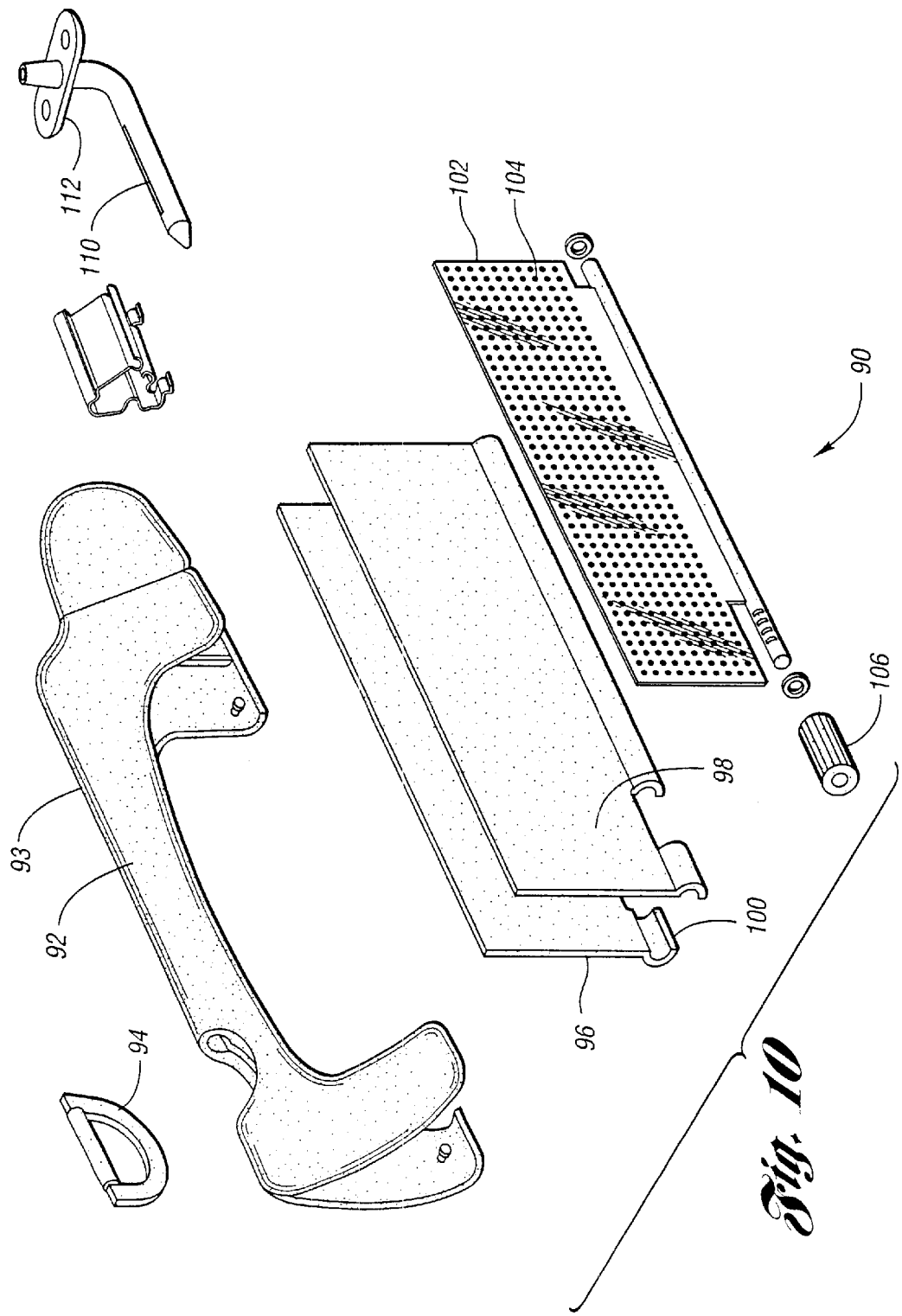

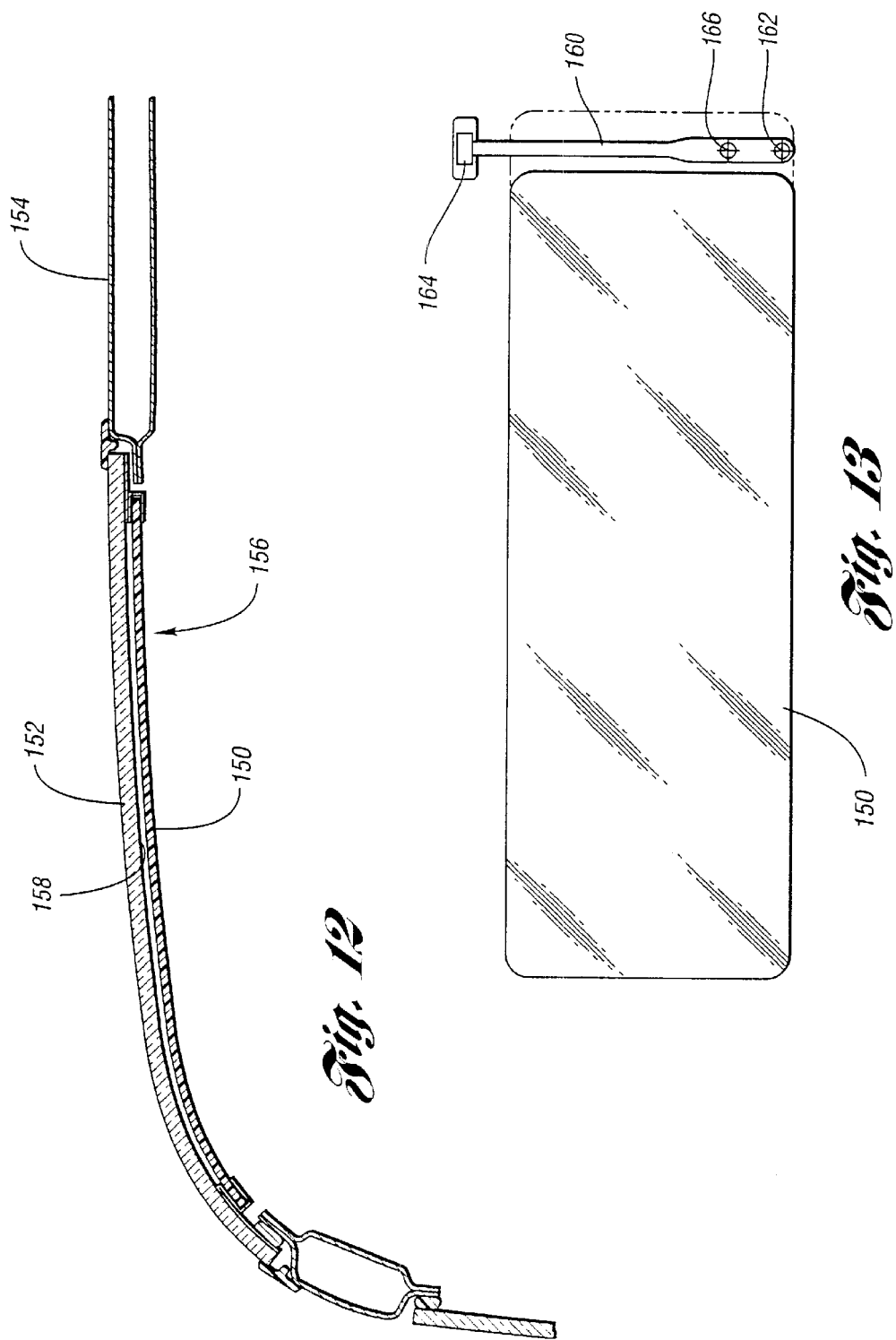

VARIABLE SUN SCREEN FOR A VEHICLE

CROSS-REFERENCE TO RELATED APPLICATIONS

This application claims the benefit of U.S. provisional application Ser. No. 60/232,023, filed Sep. 12, 2000.

TECHNICAL FIELD

The present invention relates to a variable sun screen for a vehicle in which first and second relatively movable sheet members are provided with selectively alignable opaque and transparent matrices for adjusting the level of opacity of the sun screen.

BACKGROUND ART

Vehicle sun screening members, such as sun visors, are required to "block the sun" to improve visibility for the driver, but it may be advantageous at times to have a certain percentage visibility through the visor. For example, it may be desirable to see an overhead traffic signal when the sun is directly ahead and low in the sky. At other times, the visor may need to be totally opaque.

It may also be desirable to selectively vary the percentage of visibility through a sunroof or overhead vehicle window. This may be necessary to reduce glare inside the vehicle, or to reduce heat build-up inside the vehicle which results from unobstructed sunlight through a window or sunroof.

DISCLOSURE OF INVENTION

The present invention provides a variable shade sun screen having first and second relatively movable sheets with alignable or offsetable matrices of translucent and opaque portions to selectively vary the opacity of the sun screen. This invention can be used in a sun visor, a sunroof, or adjacent any vehicle window surface.

In one embodiment, the invention allows for adjustment of a matrix of matching shapes, opaque in nature, printed or otherwise applied to two clear sheets of material, one sheet being stationary within a sun visor body, the second being adjustable laterally by means of an adjuster on the periphery of the visor.

In another embodiment, a movable clear film is imprinted with a dot pattern, and two transparent fixed blades are bonded to an opaque bottom edge extrusion. A hole pattern is printed on an inside surface of one of the blades. The dot pattern and hole pattern may be selectively aligned or misaligned to adjust opacity of the assembly. Various embodiments for implementing this structure are contemplated and described herein.

In a further embodiment of the invention, a movable inner panel is applied against an outer glass panel on the roof of a vehicle. The inner movable panel includes a matrix of matching opaque shapes for adjustment with respect to a corresponding matrix of translucent portions on the outer glass panel. The matrix of translucent portions may be formed by silk-screening on an inside surface of the outer glass panel.

Accordingly, an object of the invention is to provide a method and apparatus for variably adjusting the opacity of a vehicle window sun screen.

The above objects and other objects, features, and advantages of the present invention are readily apparent from the following detailed description of the best modes for carrying out the invention when taken in connection with the accompanying drawings.

BRIEF DESCRIPTION OF DRAWINGS

FIG. 8 shows a perspective view of a clamshell sun visor housing in accordance with the embodiment of FIG. 4;

FIG. 9 shows an exploded perspective view of a sun visor assembly in accordance with a third embodiment of the invention;

FIG. 10 shows an exploded perspective view of a sun visor assembly in accordance with a fourth embodiment of the invention;

FIG. 12 shows a cut-away vertical cross-sectional view of a sun screen on a roof glass panel of a vehicle in accordance with a six embodiment of the invention; and FIG. 13 shows a schematic plan view of an adjustment mechanism for the sun screen of FIG. 12.

DETAILED DESCRIPTION OF THE PREFERRED EMBODIMENTS

Figure 1:
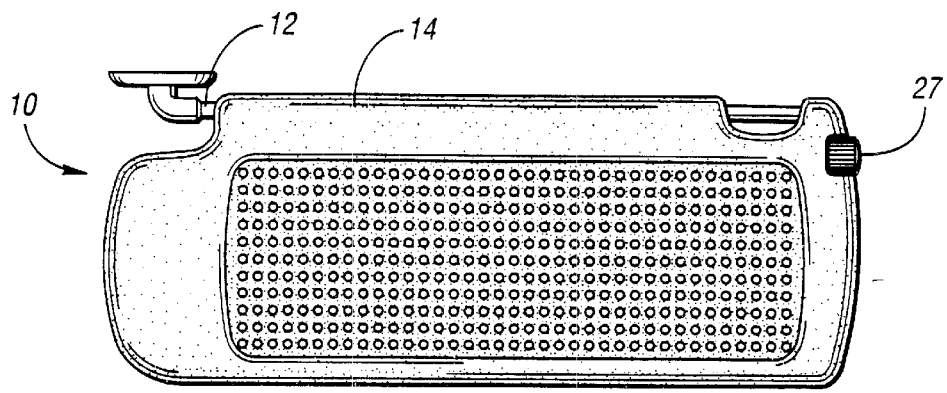
FIG. 1 shows a plan view of a sun visor in accordance with a first embodiment of the invention.
Figure 2:
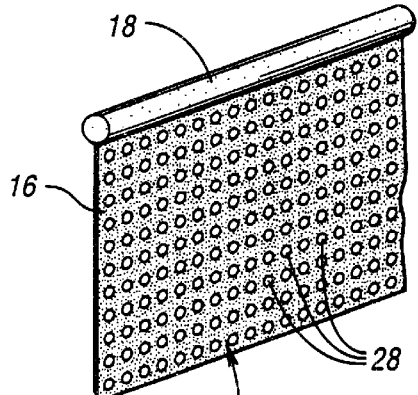
FIG. 2 shows a partially cut-away perspective view of a stationary shade member corresponding with FIG. 1.
Figure 3:
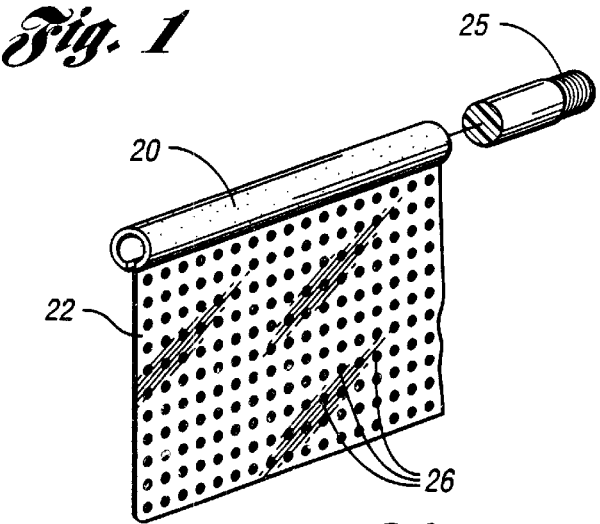
FIG. 3 shows a partially cut-away perspective view of a movable shade corresponding with the embodiment of FIG. 1.
Figure 4:
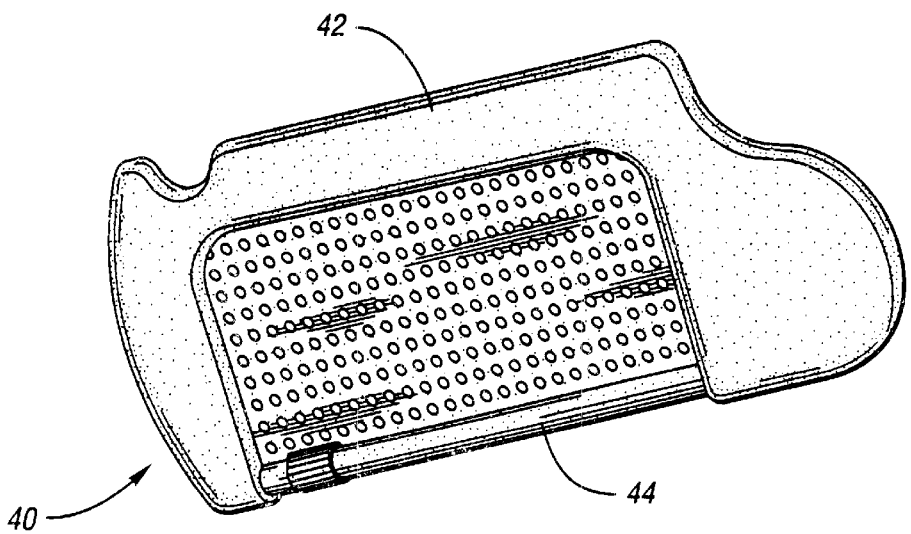
FIG. 4 shows a plan view of a sun visor in accordance with a second embodiment of the invention.
Figure 5:
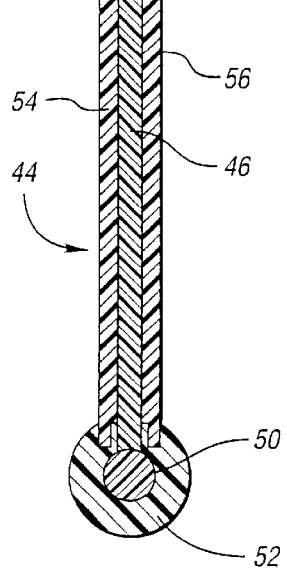
FIG. 5 shows a vertical cross-sectional view taken through the sun visor of FIG. 4.
Figure 6:
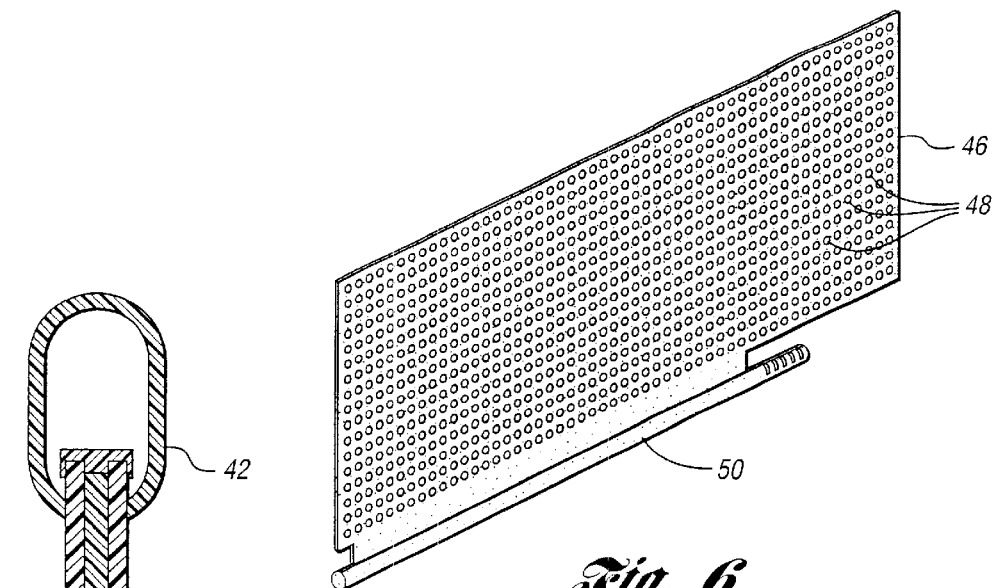
FIG. 6 shows a perspective view of a movable shade corresponding with the embodiment of FIG. 4.
Figure 7:
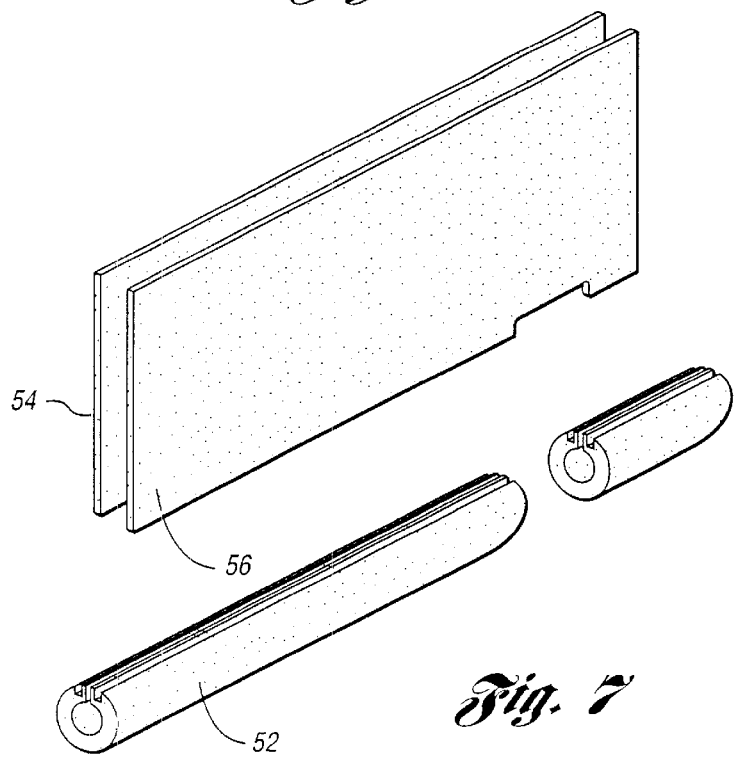
FIG. 7 shows an exploded perspective view of transparent fixed blades and a bottom edge extrusion corresponding with the embodiment of FIG. 4.

Referring to FIGS. 1–3, a first embodiment of a variable shade sun visor 10 is shown in accordance with the present invention. The variable shade sun visor 10 includes a support arm 12 which supports a visor body 14. The visor body 14 encloses a stationary shade 16 having a support rod 18 which is slidably received within a sleeve 20 which supports the movable shade 22.

An adjuster 27 cooperates with threads 26 on the sleeve 20 for selectively moving the movable shade 22 fore and aft along the visor body 14 with respect to the stationary shade 16 to selectively adjust the position of the dot matrix 26 with respect to the corresponding hole matrix 28 on the stationary shade 16.

When the dot matrix 26 is aligned with the hole matrix 28, the sun visor 14 is 100% opaque, and when the dot matrix 28 is adjusted to a position out of alignment with the hole matrix 28, approximately 80% opacity is achieved. The dot matrix 26 and hole matrix 28 may be silk-screened onto the stationary shade 16 and movable shade 22, which are both translucent sheets.

Of course, a variety of configurations are contemplated under the present invention for the arrangement and shape of the dot matrix and hole matrix. Also, the hole matrix 28 may be actual holes through the stationary shade 16, or may be an opaque pattern 29 which is silk-screened onto a translucent sheet forming the stationary shade 16. The opaque pattern 29 would be absent in the dots or translucent portions to form the hole matrix 28. Furthermore, the dot matrix 26 and hole matrix 28 may alternatively be on the stationary or movable component.

Additionally, the shape of the dots in the dot matrix 26 and the holes in the hole matrix 28 need not be round. They may be diamond-shaped, square, etc.

Referring now to FIGS. 4–8, a second embodiment of a variable shade sun visor 40 is shown. As shown, the variable shade sun visor includes a visor body 42 which houses a variable opacity sun screen 44. As shown, the variable opacity sun screen 44 comprises a clear film 46 imprinted with a dot matrix 48 and supported by a molded rod 50. The molded rod 50 is slidably supported within the sleeve 52, which is an extruded component which supports two transparent fixed blades 54, 56, one of which has a hole pattern imprinted on an inside surface thereof. The sleeve 52 is preferably opaque. The visor body 42 is hinged at the lower edge to form a clamshell-type configuration.

In order to adjust the opacity of the sun screen 44, the clear film 46 is selectively moved longitudinally along the visor body 42 to adjust the dot matrix 48 with respect to a corresponding hole matrix formed on one of the translucent fixed blades 54, 56.

FIG. 9 shows an exploded perspective view of a variable shade sun visor 60 in accordance with a third embodiment of the invention, which is a slight variation of that shown in FIGS. 4–8. As shown, the variable shade sun visor 60 includes a non-structural foam body 62, and the fixed blades 64, 66 are molded together as a single component and attached by the detent spring 68 to the arm 70 and bracket 72 for attachment to the vehicle roof. The prior art D-ring is replaced by the rod 74 which is selectively attachable to the vehicle overhead check (not shown).

The movable shade 76 is provided with a dot matrix 78, and a threaded adjuster 80 is provided for selectively adjusting the longitudinal position of the movable shade 76 with respect to the fixed blades 64, 66, one of which will have a hole matrix imprinted thereon. The rod 82 of the movable shade 76 is slidably disposed within the sleeve 84, which is integral with the fixed blades 64, 66. The fixed blades 64, 66 are preferably a thermally formed matte-finished acrylic or other transparent material.

The fourth embodiment shown in FIG. 10 differs from the embodiment of FIG. 9 in that the variable shade sun visor 90 includes a structural visor body 92 having a D-ring 94 such that the D-ring and visor body 92 support the load of the sun visor. The visor body 92 is a clamshell member pivoted at the top edge 93. The fixed blades 96, 98 are molded separately and glued together at a bottom edge 100. The movable blade 102 includes the dot matrix pattern 104 for selective adjustment with respect to a hole pattern on one of the fixed blades 96, 98. A threader adjuster 106 is provided for selectively adjusting the movable blade 102 with respect to the fixed blades 96, 98. Also, the standard detent spring 108 and arm 110 with bracket 112 are also provided.

Figure 11:
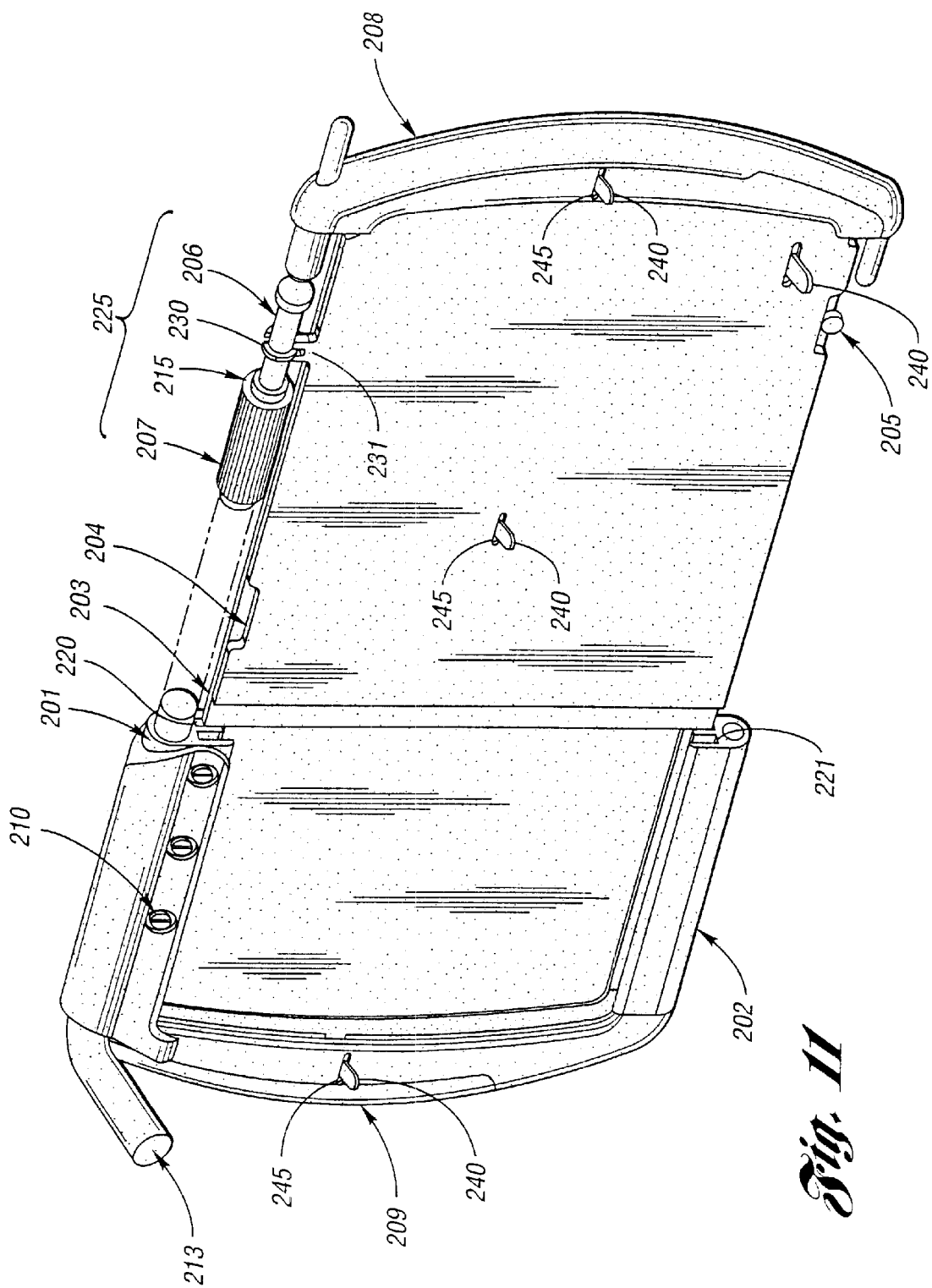
FIG. 11 shows a partial exploded view of a fifth embodiment in accordance with the present invention.

Referring now to FIG. 11, a fifth embodiment of the invention is shown. A frame is comprised of an upper member 201, a lower member 202, an inboard endcap 208, and an outboard endcap 209. The upper and lower members are preferably extruded out of metal or plastic. Other processes, such as injection molding, may also be used to manufacture the parts. The endcaps are preferably injection molded. At least the upper member 201 and the lower member 202 comprise two slots therein 220 and 221 for receiving the fixed blade 203 and the adjustable blade 204 respectively. The fixed blade 203 is fixed to the upper and lower members 201, 202 with, for example, an adhesive.

The blades are adjustable by means of a screw adjuster assembly 225 which comprises an adjuster rod 206 having a thread 230, a bushing 215, and an adjuster wheel 207. The thread 230 fits inside protrusion 231 of the movable blade 204. To prevent movement of the screw adjuster assembly 225, the screw adjuster assembly abuts endcap 208 and upper member 201. When the adjuster wheel 207 is turned, the movable blade 204 moves fore and aft in groove 221. One or more blade rollers 205 may be attached to the movable blade 204 to reduce friction.

Alternative to the rollers, a plurality of slots 245 in one blade can be engaged by a matching number of pins 240 protruding from the other blade to align one matrix to the other and prevent excessive friction within the frame components.

As discussed above, the fixed blade 203 and the movable blade 204 comprise dot and hole matrices.

Referring to FIGS. 12 and 13, a sixth embodiment of the invention is shown, wherein an inner movable panel 150 cooperates with an outer glass panel 152 on a vehicle roof 154 to form a sun screen assembly 156. Preferably, the inner movable panel 150 is provided with a dot matrix thereon, and a hole matrix is silk-screened or otherwise applied to an inside surface 158 of the outer glass panel 152 to provide selective adjustability of the dot matrix with respect to the hole matrix when the movable panel 150 is slid along the outer glass panel 152.

FIG. 12 shows an adjustment lever 160 which provides a long moment arm between a pivot point 162 and an adjustment point 164 to provide minor adjustment of an attachment point 166 which is fixed to the movable shade 150 for selectively moving the movable shade 150 when the adjustment point 164 is actuated by a vehicle occupant to adjust the relationship of the dot matrix and hole matrix for adjusting opacity of the sun screen assembly 156.

While various embodiments of the invention have been shown and described in detail, those familiar with the art to which this invention relates will recognize various alternative designs and embodiments for practicing the invention without departing from the spirit and scope of the invention as described herein.

What is claimed is:

1. A variable shade sun screen comprising:
   a sun shade body; and
   first and second relatively movable non-porous sheets supported by the sun shade body, each having matrices of translucent and opaque portions thereon;
   wherein at least one of said sheets is movable with respect to the other sheet to selectively align and offset said matrices to vary the opacity of the sun screen.

2. The variable shade sun screen of claim 1 wherein the first relatively movable sheet is fixed within the sun shade body.

3. The variable shade sun screen of claim 2 further comprising a support rod having threads thereon and attached to the first relatively movable sheet; a sleeve sized to fit over the support rod, the sleeve attached to the second relatively movable sheet; and an adjuster which cooperates with the threads on the support rod to move the second relatively movable sheet relative to the first relatively movable sheet.

4. The variable shade sun screen of claim 1 wherein the first relatively movable sheet is an outer glass panel and further comprising an adjustment lever for variably moving the second relatively moving sheet relative to the first relatively moving sheet.

5. The variable shade sun screen of claim 1 wherein the sun shade body further comprises at least an upper and a lower member, the members having first and second grooves therein, wherein the first relatively moving sheet is disposed in the first groove and the second relatively movable sheet is disposed in the second groove.

6. The variable shade sun screen of claim 5 wherein the upper and lower members comprise first and second ends and the variable shade screen further comprises first and second endcaps connecting the first and second ends of the upper and lower members; and an adjuster assembly for variably moving the second relatively moving sheet relative to the first relatively moving sheet.

7. A variable shade sun screen comprising:
a sun screen body;
a support arm for supporting the sun screen body;
a stationary shade having a support rod enclosed within the screen body, having see-through and opaque portions; and
a movable shade having a sleeve sized to receive the support rod of the stationary shade.

8. The variable shade sun screen of claim 7 further comprising threads on the support rod and an adjuster which cooperates with the threads on the support rod to move the movable shade with respect to the stationary shade.

9. The variable shade screen of claim 7 wherein the see-through and opaque portions on the stationary shade are made up of a hole matrix on silk-screened opaque material.

10. The variable shade screen of claim 7 wherein the see-through and opaque portions on the movable shade are made up of a silk-screened dot matrix on a translucent material.

11. A variable adjustable sun screen comprising:
a screen body;
a variable opacity sun screen housed inside the screen body comprising a clear film imprinted with a dot matrix and supported by a rod; and
a sleeve disposed within the screen body which supports at least one transparent fixed blade having a hole pattern imprinted thereon, the sleeve sized to receive the rod and wherein the clear film is selectively moved along the screen body to adjust the opacity of the screen.

12. The variable adjustable sun screen of claim 11 further comprising an arm and a bracket and wherein a pair of fixed blades are molded together forming a sleeve which is attached to the arm using a detent spring.

13. The variable adjustable sun screen of claim 12 further comprising threads on the rod and an adjustment threaded to selectively adjust the position of the clear film relative to the fixed blades.

14. A variable shade screen assembly for an automotive vehicle having an outer glass panel having an opaque matrix, the variable shade screen assembly comprising:
a movable shade that moves relative to the outer glass panel, the movable shade having an opaque matrix thereon; and
an adjustment lever fixed to the movable shade and providing adjustment capability such that the matrix on the movable shade can be adjusted relative to the matrix on the outer glass panel to allow for variable shading.

* * * * *